Patented Oct. 3, 1950

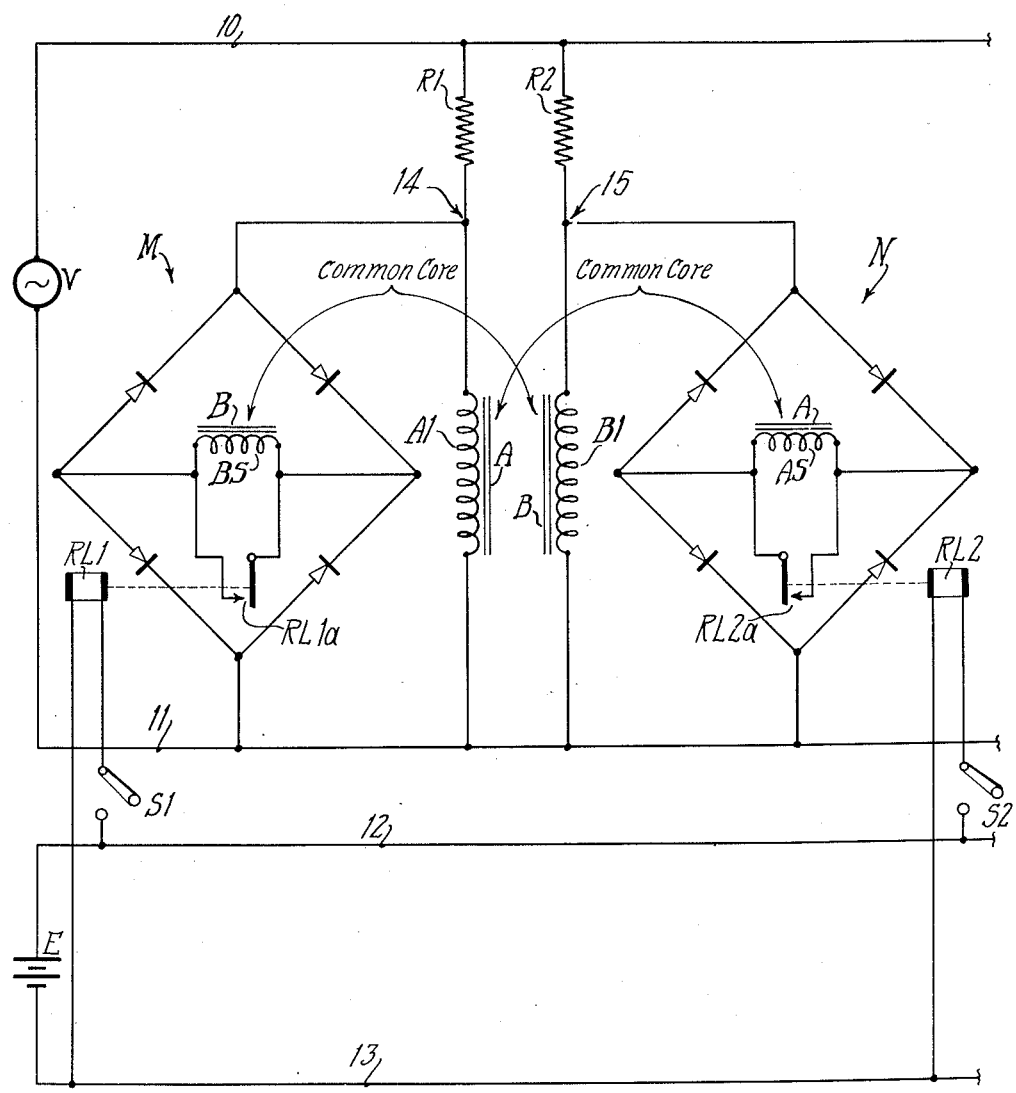

2,524,154

UNITED STATES PATENT OFFICE 2,524,154

ELECTRICAL TRIGGER

Marion Loren Wood, North Tarrytown, N. Y., assignor to International Business Machines Corporation, New York, N. Y., a corporation of New York Application January 5, 1949, Serial No. 69,306

8 Claims. (Cl. 171—97)

This invention pertains to a trigger circuit in which the usual electron tubes are replaced by saturable core reactors.

A saturable core reactor may be briefly described as a variable inductor including an A. C. winding, the A. C. permeability of the flux path of the inductor being controllable by the controlled variation of the D. C. flux in said path, usually by means of the application of a direct current to an auxiliary winding thereby allowing for controlled variation of the inductance. Hence, of the two coils, one is supplied with alternating current and the other with direct current. The incremental permeability of the alternating current flux path is altered by changes in the value of direct current applied. A reduction in the value of direct current produces an increase in the incremental permeability while an increase in the value of the direct current produces a decrease in the incremental permeability. Thus changes in the value of direct current can be utilized to produce changes in the inductance of the alternating current coil of the reactor.

The principal object of the invention is to provide a trigger circuit in which the so-called flipping or triggering action is initiated by a change in the incremental permeability of a magnetic element.

A further object is to provide a trigger circuit in which the status is altered by the initiation of a change in permeability of a magnetic element rather than by initiation of a change in the potential of a control grid or plate of a vacuum tube.

Still a further object is to provide a trigger circuit employing changes in flux density rather than changes in voltage to initiate a change in the flow of electric current in the two elements of a trigger.

Another object is to provide a trigger circuit comprising two elements of variable incremental permeability and means for producing simultaneously opposite changes of value of permeability in said elements to produce the so-called flipping action of the trigger.

A further object is to provide a trigger comprising two elements of variable permeability, rectifier means for each element and means for producing a change in permeability in one element to thus control the rectifier of the other element to produce an opposite change in the permeability of said other element whereby the so-called flipping of the trigger is produced.

Other objects of the invention will be pointed out in the following description and claims and illustrated in the accompanying drawing, which discloses, by way of example, the principles of the invention and the best mode, which has been contemplated, of applying that principle.

In the drawing, the sole figure illustrates in a schematic form the essential elements of a trigger incorporating saturable reactors.

Referring to the drawing, there is shown therein a source V of alternating voltage and output conductors 10 and 11 connected thereto and supplying energy to the novel reactor trigger circuit.

One portion of the novel trigger supplied by the output conductors 10 and 11 comprises a resistor R1 in series with the alternating current winding A1 of a saturable core reactor A designed to meet the amplification characteristics as outlined below. A full wave rectifier M shown as a metallic oxide rectifier but which may be any desirable form of full wave rectifier is connected in parallel with the winding A1. A direct current saturating winding BS of a saturable core reactor B of the same design characteristics as reactor A is connected across one diagonal of rectifier M, as shown, while shunting the winding BS are normally open contacts RL1a of a relay RL1.

Another similar portion of the trigger is also supplied by the conductors 10 and 11 and comprises a resistor R2 in series with the alternating current winding B1 of the saturable core reactor B. Similarly, a full wave rectifier N of the metallic oxide type is connected in parallel with the winding B1 and a direct current saturating winding AS of the saturable core reactor A is connected across one diagonal of rectifier N, while normally open contacts RL2a of a relay RL2 shunt the winding AS.

A source of direct current E supplies the coils of relays RL1 and RL2 via the conductors 12 and 13, relay RL1 being connected across the conductors 12 and 13 as shown, by means of a normally open switch S1 and relay RL2 by means of a normally open switch S2. It is to be particularly noted that both the direct current and alternating current windings of each reactor, respectively, are mounted upon a common core as indicated in the drawing.

As is apparent from the drawing, the two saturable core reactors A and B are so interconnected that the voltage across direct current winding BS, is proportional to the alternating current voltage across the winding A1 and the voltage across the direct current winding AS is proportional to the alternating current voltage across the winding B1.

The general principle of operation of this novel trigger can be more readily understood if the characteristics of a saturable reactor as a control device are compared to those of the generally employed impedance devices such as a vacuum tube. The alternating current winding of the reactor can be considered to be a variable impedance whose value is determined by the amount of direct current passing through the direct current winding of this reactor. This is somewhat analogous to a three element vacuum tube, in which the plate impedance is varied by the potential on the control grid.

As in the vacuum tube type of trigger, this saturable core reactor trigger may be considered as comprising two stages of amplification in which the output of the second stage serves as the input to the first. If the amplification factor of each stage is greater than unity, there are two states of stable equilibrium. Two such states of stable equilibrium are the very essence of a trigger circuit. Such amplification can be obtained by designing a saturable reactor so that a small change in the direct current voltage produced across the control winding of a first reactor, produces a change in the alternating current voltage, across its alternating current winding, of such value that when rectified and applied to the direct current winding of a second similar reactor, the resultant change in voltage drop across this winding is greater than the direct current voltage change originally produced across the control winding of the first reactor. The first and second reactors must also be identically loaded, that is, the alternating current winding of one must be shunted by an impedance, equal in vector magnitude to the impedance shunting the alternating current winding of the other.

In order to simplify the explanation of the operation of the novel trigger, let it be assumed, that due to the inherent characteristics of the circuit elements the trigger circuit is in one of its two stable conditions with the voltage from source V applied thereto. In one such condition, the voltage at point 14 is higher than that at point 15 and the current flow through the rectifier M is higher than that through rectifier N. This condition is achieved as follows:

Upon an increase in direct current flow through the winding BS of the saturable reactor B, the flux density increases and the permeability of the core of reactor B, decreases. With such a decrease in permeability, the inductance of winding B1, which is proportional to the permeability, also decreases, so that the voltage distribution across resistor R2 and winding B1 is such that the potential at point 15 decreases. As a result, the current flowing through the winding AS of the reactor A decreases, the flux density of its core decreases and the permeability of its core increases, which causes the inductance of winding A1 to similarly increase and thus increase the potential at point 14. This action is cumulative until that condition of stable equilibrium is reached in which the alternating current voltage across the winding A1 is high because the direct current voltage across the winding AS is low so that the direct current voltage across the winding BS is high and the alternating current voltage across the winding B1 is low. Thus, with the voltage at point 14 higher than the voltage at point 15, as assumed above, one condition of stability is achieved and will be maintained until further operations ensue. The other condition of stability is the converse of the condition of stability just described.

Assuming that the first condition of stability, as just described, exists, the trigger is flipped as follows:

Switch S1 is closed, which energizes relay RL1 which in turn closes its normally open contacts RL1a to shortcircuit coil BS and thus reduce its direct current voltage to zero. In accordance with the well known saturable core reactor characteristics, the impedance of the alternating current winding B1 of reactor B is increased so that the voltage across B1 is also increased to thus increase the voltage across the direct current winding AS of reactor A, which, in accordance with the well known saturable core reactor characteristics, decreases the impedance of winding A1. Upon such a decrease in the impedance of winding A1, the voltage across this winding will decrease thus increasing the voltage drop across R1 and the voltage at point 14 decreases while that at point 15 is increasing. This effect is cumulative until the voltage drop across the winding B1 becomes a maximum. Then, upon opening the switch S1, relay RL1 is deenergized, contacts RL1a open and the voltage across winding BS will be less than its original value just prior to the closure of contacts RL1a and the trigger will have assumed its converse condition of equilibrium.

Upon closure of switch S2, relay RL2 will close its contacts RL2a and the circuit will restore itself to its first state of equilibrium.

It is to be specifically understood that while control of a full wave rectifier by a switch has been illustrated as a means of altering the permeability of the cores of the saturable reactors, the invention is not so limited and that any desirable means may be employed for initiating and maintaining a change in permeability by changing the direct current value.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A trigger circuit having two sustained states of equilibrium comprising a plurality of ferromagnetic cores, a pair of windings on each of said cores, means supplying direct current to one winding of each pair and alternating current to the other, means for varying the direct current in each of said direct current windings, means interconnecting said windings so that the permeability of one core is variable by a change in the direct current flow to thereby vary the direct current input to the other, and means for initially altering the value of direct current in one such winding.

2. A trigger circuit having two states of equilibrium comprising a plurality of saturable core reactors, each of said reactors having a direct current winding and an alternating current winding, means including the alternating current winding of one reactor to control the direct current input to the winding of the other reactor and vice versa, and means for initiating a change in the incremental permeability of a first reactor to alter the value of direct current flow in the direct current coil of the other reactor to thereby alter in a reverse direction the value of direct current in the direct current coil of the first reactor.

3. A trigger circuit having two states of equilibrium comprising a plurality of variable impedance elements each having a ferro-magnetic core, means for varying the permeability of said cores and means interconnecting said reactors whereby an increase in permeability of one core produces an opposite change in the permeability of the other core, and means for initiating a change in the permeability of either of said cores, separately and independently.

4. A trigger circuit capable of being reversed from one state of equilibrium to the other comprising a pair of saturable reactors each having a ferro-magnetic core, a pair of alternating current and direct current windings, respectively wound about each of said cores, a rectifier in parallel with each of said alternating current windings, and means controlling the variation in the uni-directional current output of one of said rectifiers whereby the reactor permeability is varied, and means interconnecting said reactors whereby an increase in the permeability of one reactor produces a decrease in the permeability of the other and vice versa.

5. A trigger circuit having two states of equilibrium comprising a pair of variable impedance elements, each of said elements having a ferromagnetic core, a main winding and an auxiliary winding operatively associated with each core, a rectifier in parallel with each main winding, normally open relay contacts shunting one of said auxiliary windings, switch means controlling the operation of said relay whereby the uni-directional current of one of said auxiliary windings is made to vary, and means interconnecting all said windings whereby a change in the value of uni-directional current in one auxiliary winding produces an opposite change in the value of the uni-directional current in the other auxiliary winding to thereby alter the state of equilibrium from one to the other.

6. A device comprising a pair of saturable core reactors, means interconnecting the alternating current and direct current coils of said reactors whereby the alternating current coil of one controls the flow in the direct coil of the other and vice versa, means comprising a rectifier operatively connected to each of said direct current coils, the input of each of said rectifiers being controlled by the alternating current coil of the other reactor, and means altering the permeability of one core to produce an opposite change in the permeability of the other core.

7. A trigger circuit comprising a pair of variable inductance elements, a pair of rectifiers supplying direct current to said elements, and means producing a change in direct current flow in one inductive element whereby the input to the other rectifier is changed to produce an opposite change in direct current flow in the other inductive element.

8. A trigger circuit comprising a pair of inductive elements each comprising an alternating current coil and a direct current coil and a common permeable element, a pair of rectifiers, means connecting each rectifier to one direct current coil, respectively, a source of alternating current for said alternating current coils and means for altering the direct current flow from one rectifier to one coil to thus alter the alternating current flow in its associated coil whereby the input to the other rectifier is altered to produce an opposite change of direct current flow in the other direct current coil.

MARION LOREN WOOD.

REFERENCES CITED

The following references are of record in the file of this patent:

UNITED STATES PATENTS

| Number | Name | Date |
| --- | --- | --- |
| 2,010,610 | Simpson | Aug. 6, 1935 |
| 2,010,614 | Suits | Aug. 6, 1935 |